US011159031B2

(12) United States Patent
Ohashi

(10) Patent No.: US 11,159,031 B2
(45) Date of Patent: Oct. 26, 2021

(54) ELECTRICAL MACHINERY AND APPARATUS

(71) Applicant: Sony Interactive Entertainment Inc., Tokyo (JP)

(72) Inventor: Tsuyoshi Ohashi, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 211 days.

(21) Appl. No.: 16/336,954

(22) PCT Filed: Oct. 2, 2017

(86) PCT No.: PCT/JP2017/035843
§ 371 (c)(1),
(2) Date: Mar. 27, 2019

(87) PCT Pub. No.: WO2018/066520
PCT Pub. Date: Apr. 12, 2018

(65) Prior Publication Data
US 2020/0099236 A1 Mar. 26, 2020

(30) Foreign Application Priority Data

Oct. 7, 2016 (JP) .............................. JP2016-199421

(51) Int. Cl.
*H02J 7/00* (2006.01)
*H02J 7/04* (2006.01)
*H02J 7/14* (2006.01)

(52) U.S. Cl.
CPC ............ *H02J 7/0022* (2013.01); *H02J 7/045* (2013.01); *H02J 7/1423* (2013.01)

(58) Field of Classification Search
USPC ................................................ 320/116, 125
See application file for complete search history.

(56) References Cited

U.S. PATENT DOCUMENTS 5,666,006 A * 9/1997 Townsley ............... H02J 7/0024
307/66
5,818,200 A * 10/1998 Cummings ............ G11C 5/141
320/116

(Continued)

FOREIGN PATENT DOCUMENTS

EP        2523301 A1    11/2012
JP     2009171694 A     7/2009

(Continued)

OTHER PUBLICATIONS

International Preliminary Report on Patentability and Written Opinion for corresponding PCT Application No. PCT/PCT/JP2017/035843, 13 pages, dated Apr. 18, 2019.

(Continued)

*Primary Examiner* — Samuel Berhanu
(74) *Attorney, Agent, or Firm* — Matthew B. Dernier, Esq.

(57) ABSTRACT

An electrical machinery and apparatus has a first rechargeable battery, and a second rechargeable battery different in characteristics from the first rechargeable battery built therein, the electrical machinery and apparatus including: a first charging circuit charging the first rechargeable battery; and a second charging circuit charging the second rechargeable battery. The second charging circuit charges the second rechargeable battery with an electric power supplied from an outside of the electrical machinery and apparatus, and the first charging circuit charges the first rechargeable battery with both the electric power supplied from the outside of the electrical machinery and apparatus, and an electric power supplied from the second rechargeable battery.

3 Claims, 5 Drawing Sheets

(56) References Cited

U.S. PATENT DOCUMENTS

| | | | | |
|---|---|---|---|---|
| 5,955,867 | A * | 9/1999 | Cummings | H02J 7/00 320/107 |
| 5,959,368 | A * | 9/1999 | Kubo | H02J 7/0025 307/18 |
| 8,248,031 | B2 * | 8/2012 | Yamasaki | G06F 1/263 320/124 |
| 9,889,751 | B2 | 2/2018 | Jang | |
| 2004/0113585 | A1 * | 6/2004 | Stanesti | H02J 7/0018 320/116 |
| 2004/0257047 | A1 * | 12/2004 | Frantz | H02J 7/0022 320/138 |
| 2005/0189922 | A1 * | 9/2005 | Maskatia | G06F 1/263 320/138 |
| 2006/0063044 | A1 | 3/2006 | DeVries | |
| 2007/0032915 | A1 | 2/2007 | Yamaguchi | |
| 2007/0216355 | A1 * | 9/2007 | Kim | H02J 7/0024 320/128 |
| 2009/0179613 | A1 | 7/2009 | Masho | |
| 2011/0006735 | A1 * | 1/2011 | Wu | H02J 7/00047 320/125 |
| 2013/0020983 | A1 * | 1/2013 | Ishikawa | H02J 5/00 320/104 |

FOREIGN PATENT DOCUMENTS

| | | |
|---|---|---|
| JP | 2013085413 A | 5/2013 |
| JP | 2015530858 T | 10/2015 |
| JP | 2016082824 A | 5/2016 |

OTHER PUBLICATIONS

Extended European Search Report for corresponding EP Application No. 17858358.9, 6 pages, dated Mar. 11, 2020.

International Search Report for corresponding PCT Application On. PCT/JP2017/035843, 2 pages, dated Nov. 7, 2017.

Notification of Reason for Refusal for corresponding JP Application No. 2018543897, 12 pages, dated Feb. 18, 2020.

* cited by examiner

ELECTRICAL MACHINERY AND APPARATUS

TECHNICAL FIELD

The present invention relates to an electrical machinery and apparatus which operates with an electrical power supplied from a secondary battery.

BACKGROUND ART

Some electrical machinery and apparatuses each of which operates by consuming an electric power supplied from a secondary battery to operate need a relatively large current in a short period of time. For such a use application, a secondary battery showing a large maximum discharge current is desirably used. On the other hand, for reducing the number of times of the charging, or for using the electrical machinery and apparatus over a long period of time without being charged, a density of energy accumulable within the electrical machinery and apparatus is desirably increased.

SUMMARY

Technical Problem

It is difficult to fulfill the different requests as described above by only one kind of secondary battery in some cases. Then, it is considered to use a plurality of kinds of secondary batteries different in characteristics from one another. However, a method of efficiently utilizing such a plurality of kinds of secondary batteries has not been sufficiently examined until now.

The present invention has been made in consideration of the actual situation described above, and it is therefore one of objects thereof to provide an electrical machinery and apparatus which operates by efficiently utilizing a plurality of kinds of secondary batteries.

Solution to Problem

An electrical machinery and apparatus according to the present invention is an electrical machinery and apparatus having a first rechargeable battery and a second rechargeable battery different in characteristics from the first rechargeable battery built therein, the electrical machinery and apparatus including a first charging circuit charging the first rechargeable battery, and a second charging circuit charging the second rechargeable battery. The second charging circuit charges the second rechargeable battery with an electric power supplied from an outside of the electrical machinery and apparatus, and the first charging unit charges the first rechargeable battery with both the electric power supplied from the electrical machinery and apparatus, and the electric power supplied from the secondary rechargeable battery.

DESCRIPTION OF EMBODIMENT

Hereinafter, an embodiment of the present invention will be described in detail with reference to drawings.

Figure 1:
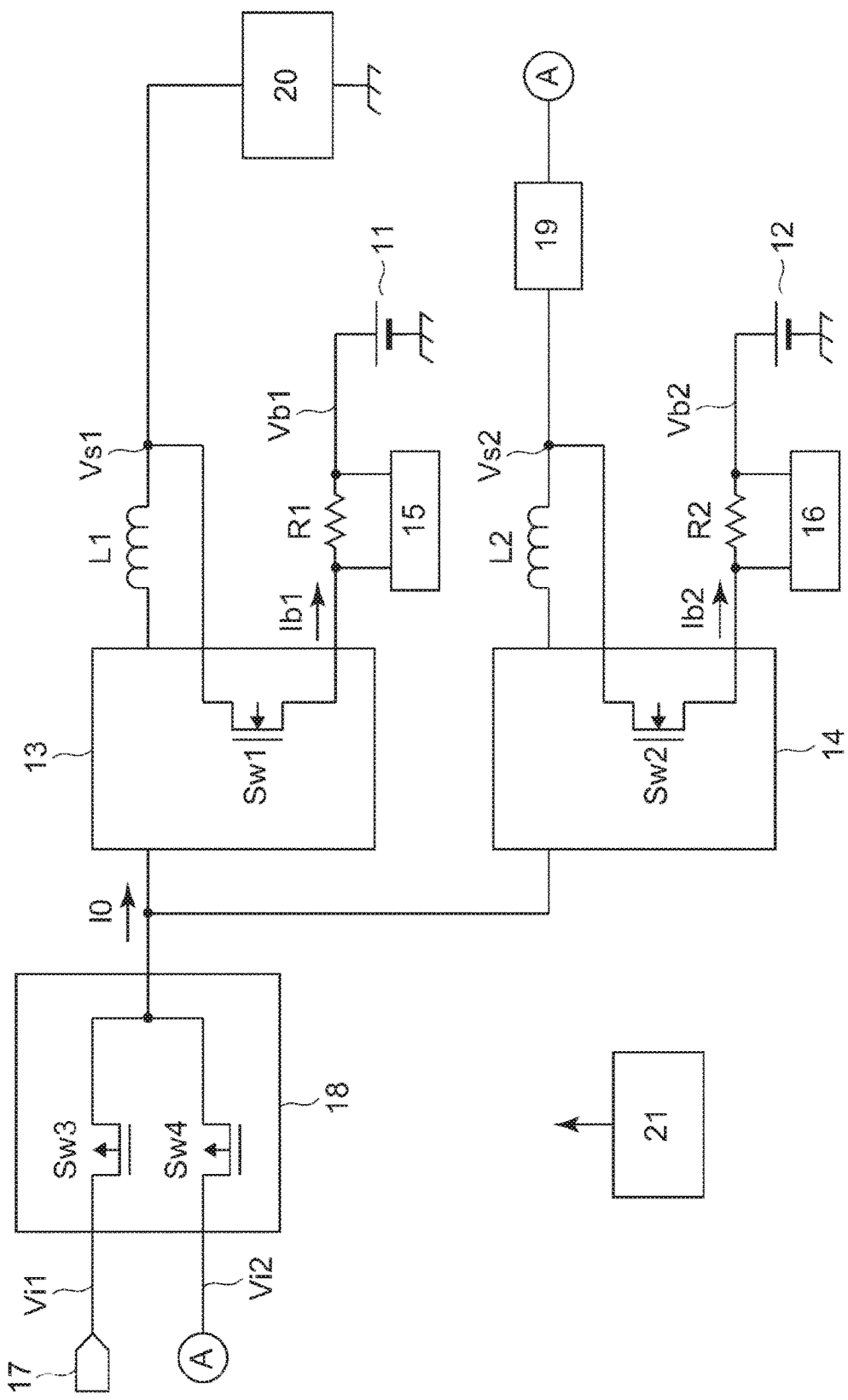
FIG. 1 is a circuit diagram depicting a circuit configuration of an electrical machinery and apparatus according to an embodiment of the present invention.

FIG. 1 is a circuit diagram depicting a circuit configuration of an electrical machinery and apparatus 1 according to an embodiment of the present invention. As depicted in the figure, the electrical machinery and apparatus 1 can have a first rechargeable battery 11 and a second rechargeable battery 12 built therein. The electrical machinery and apparatus 1 includes a first charging circuit 13, a second charging circuit 14, a first capacity calculating circuit 15, a second capacity calculating circuit 16, a power source terminal 17, a switching circuit 18, a boosting circuit 19, a load 20, and a control circuit 21. The electrical machinery and apparatus 1 according to the present embodiment may be various apparatuses, which operate with the electric power supplied from a rechargeable battery, such as an electric tool, an electric car, a storage battery, and an aircraft.

Each of the first rechargeable battery 11 and the second rechargeable battery 12 is a secondary battery which can repetitively perform charge/discharge, and the electrical machinery and apparatus 1 operates with the electric powers supplied from these rechargeable batteries. In the present embodiment, it is assumed that the first rechargeable battery 11 and the second rechargeable battery 12 are rechargeable batteries which are different in characteristics from each other. Here, the characteristics of the rechargeable battery are parameters such as an allowable maximum charging current, a maximum discharge current, impedance, and an energy density. The first rechargeable battery 11 and the second rechargeable battery 12 are different in at least any one of these parameters from each other. Specifically, in the present embodiment, it is assumed that the first rechargeable battery 11 is a battery which is larger in the maximum discharge current than the second rechargeable battery 12, and is smaller in the energy density and the impedance than the second rechargeable battery 12. Since the maximum discharge current is large and the impedance is small, the first rechargeable battery 11 can supply a large electric power in a short period of time as compared with the case of the second rechargeable battery 12. However, since the first rechargeable battery 11 is smaller in energy density than the second rechargeable battery 12, it is difficult for only the first rechargeable battery 11 to accumulate the sufficient electric power with the limited value. Then, by using the second rechargeable battery 12 which is larger in energy density than the first rechargeable battery 11 together with the second rechargeable battery 12 which is larger in energy density than the first rechargeable battery 11, the capacity of the electric power accumulable in the electrical machinery and apparatus 1 can be increased. As a concrete example, the first rechargeable battery 11 may be a lithium-ion battery, and the second rechargeable battery 12 may be an all-solid-state battery. In addition, the first rechargeable battery 11 may also be a laminated lithium-ion battery, and the second rechargeable battery 12 may also be a general lithium-ion battery.

The first charging circuit 13 and the second charging circuit 14 are circuits for charging the corresponding rechargeable batteries individually, and thus may be integrated circuits such as charging integrated circuits (ICs). Each of the charging circuits is connected in input side thereof to a switching circuit 18. The first charging circuit 13 is connected to the load 20 through a coil L1, and is connected to a positive polarity side of the first rechargeable battery 11 through a resistor R1. In addition, the second charging circuit 14 is connected to the boosting circuit 19 through a coil L2 and is connected to a positive polarity side of the second rechargeable battery 12 through a resistor R2.

In addition, the first charging circuit 13 has a switching element Sw1 built therein on a charging path thereof. Likewise, the second charging circuit 14 has a switching element Sw2 built therein. When these switching elements are turned OFF, the charging for the corresponding rechargeable battery is stopped. It should be noted that the internal circuit configurations of the charging circuits are omitted in the figure except for these switching elements.

The first capacity calculating circuit 15 and the second capacity calculating circuit 16 calculate the battery capacities of the corresponding rechargeable batteries individually, and input the respective calculation results to the control circuit 21. Specifically, the first capacity calculating circuit 15 is connected in parallel to the resistor R1 and measures a current Ib1 caused to flow through the first rechargeable battery 11 and a battery voltage Vb1 of the first rechargeable battery 11. Then, the first capacity calculating circuit 15 calculates the battery capacity of the first rechargeable battery 11 at a time point of the measurement by using these pieces of information. Likewise, the second capacity calculating circuit 16 is connected in parallel to the resistor R2 and measures a current Ib2 caused to flow through the second rechargeable battery 12 and a battery voltage Vb2 of the second rechargeable battery 12. Then, the second capacity calculating circuit 16 calculates the battery capacity of the secondary rechargeable battery 12 based on the measurement result.

The power source terminal 17 is a terminal which is connected to an external electric power supply source (hereinafter, referred to as an external power source). The electric power with which the first rechargeable battery 11 and the second rechargeable battery 12 are charged is supplied from the external power source through the power source terminal 17. For example, an alternate current (AC) adapter for converting an AC electric power supplied from a commercial AC power source into a direct current (DC) electric power which is in turn outputted may be connected to the power source terminal 17. Alternatively, an electrical machinery and apparatus such as a universal serial bus (USB) host apparatus responding to the electric power supply may be connected to the power source terminal 17.

The switching circuit 18 is a circuit for switching a supply source of the electric power inputted to the first charging circuit 13, and includes switching elements. The power source terminal 17 and the boosting circuit 19 are connected to an input side of the switching circuit 18. The switching circuit 18 switches these connection destinations, thereby selecting one of the external power source and the second rechargeable battery 12 as a supply source of the electric power. The first charging circuit 13 and the second charging circuit 14 are connected to an output side of the switching circuit 18. When the input to the switching circuit 18 is switched to the power source terminal 17, the electric power of a voltage Vi1 supplied from the external power source is inputted to each of the first charging circuit 13 and the second charging circuit 14 to be used for the charging of both the first rechargeable battery 11 and the second rechargeable battery 12. On the other hand, in the case where the input to the switching circuit 18 is switched to the boosting circuit 19, the electric power supplied from the secondary rechargeable battery 12 is inputted as the electric power of a voltage Vi2 to the first charging circuit 13 through the boosting circuit 19. This electric power is used for the charging of the first rechargeable battery 11, and for the operation of the load 20.

As an example, in FIG. 1, the switching circuit 18 includes two semiconductor switching elements Sw3 and Sw4. One of the two switching elements is selectively turned ON, whereby one of the power source terminal 17 and the boosting circuit 19 becomes the input to the switching circuit 18. Specifically, when the switching element Sw3 is turned ON, and the switching element Sw4 is turned OFF, the power source terminal 17 and the first charging circuit 13 are connected to each other. When the switching element Sw3 is turned OFF, and the switching element Sw4 is turned ON, the output of the boosting circuit 19, and the first charging circuit 13 are connected to each other. However, the configuration of the switching circuit 18 is by no means limited to the configuration depicted in FIG. 1, and the switching circuit 18 may adopt various kinds of configurations. In addition, the switching circuit 18 may be provided with a soft-start function for inrush current protection or an overcurrent protecting circuit. In addition, the switching circuit 18 may include a mechanical switching element.

The switching circuit 18 may switch the connection destination in response to a control signal from the control circuit 21. In this case, the control circuit 21 monitors presence or absence of the electric power supply to the power source terminal 17, and switches the connection destination of the switching circuit 18 over to the power source terminal 17 in the case where the electric power supply is detected. In addition, in case of the mechanical switching element, the switching circuit 18 switches the connection destination in response to presence or absence of the connection from the outside to the power source terminal 17. In any case, the connection destination of the switching circuit 18 is switched to the power source terminal 17 in the case where the electric power is supplied to the power source terminal 17, and is switched to the boosting circuit 19 in the case where no electric power is supplied. It should be noted that the switching circuit 18 may also be a switching element for switching the connection destination in response to the manipulation performed by a user.

The boosting circuit 19 boosts a voltage Vs2 outputted from the second charging circuit 14 to a voltage Vi2, and inputs the boosted voltage Vi2 to the switching circuit 18. The boosting circuit 19, for example, may be a direct current (DC)/DC converter or the like.

The load 20 is a circuit element or the like for realizing an essential function of the electrical machinery and apparatus 1, and operates by consuming the electric powers which are supplied from the external power source, the first rechargeable battery 11 and the second rechargeable battery 12. The load 20 may include various kinds of components responding to the kind of the electrical machinery and apparatus 1, such as a motor or an integrated circuit. In addition, in the case where the electrical machinery and apparatus 1 is a battery, or the like, the load which operates by consuming the electric powers supplied from the respective rechargeable batteries may be provided outside the electrical machinery and apparatus 1. The voltage Vs1 outputted from the first charging circuit 13 is inputted to the load 20.

The control circuit 21 controls the operations of the circuits within the electrical machinery and apparatus 1. Specifically, in the present embodiment, the control circuit 21 is connected to the first charging circuit 13, the second charging circuit 14, the first capacity calculating circuit 15, the second capacity calculating circuit 16, the switching circuit 18, and the boosting circuit 19. It should be noted that in FIG. 1, signal lines for realizing these connections are omitted. The control circuit 21 monitors the situation of the charging for the rechargeable batteries by the first charging circuit 13 and the second charging circuit 14. In addition, the control circuit 21 acquires the pieces of information associated with the charging capacities of the rechargeable batteries from the first capacity calculating circuit 15 and the second capacity calculating circuit 16. Then, the control circuit 21 causes the first charging circuit 13, the second charging circuit 14, and the boosting circuit 19 to operate in response to these pieces of information, thereby controlling the charge/discharge by the first rechargeable battery 11 and the second rechargeable battery 12. In addition, as described above, the control circuit 21 may monitor presence or absence of the connection to the power source terminal 17, and may switch the connection destination of the switching circuit 18 in response to the monitoring result.

Hereinafter, a description will be given with respect to an operation of the electrical machinery and apparatus 1 having the configuration which has been described so far.

First, a description will be given with respect to the operation of the electrical machinery and apparatus 1 in a state in which the external power source is connected to the power source terminal 17. When the external power source is connected to the power source terminal 17, the control circuit 21 turns ON the switching element Sw3 of the switching circuit 18, and turns OFF the switching element Sw4 of the switching circuit 18. As a result, the input to the switching circuit 18 is switched to the power source terminal 17, and the current is caused to flow from the external power source to the load 20 through the switching circuit 18, and the first charging circuit 13. As a result, the load 20 operates by consuming the electric power supplied thereto from the external power source. However, in the case where the electric power is insufficient only from the electric power from the external power source such as the case where a large amount of electric power is momentarily consumed, or the like, the load 20 may operate by consuming the electric power together with the electric power which is temporarily supplied from the first rechargeable battery 11. Such control can be realized by using the function which the first charging circuit 13 has.

Moreover, in the state in which the external power source is connected to the power source terminal 17, the control circuit 21 issues an instruction to the corresponding charging circuit so as to charge the rechargeable batteries with the electric power supplied from the external power source in response to the charging states of the first rechargeable battery 11 and the second rechargeable battery 12.

Specifically, in the case where it is decided that the battery capacity of the first rechargeable battery 11 is smaller than a charging target value based on the calculation result in the first capacity calculating circuit 15, the control circuit 21 turns ON the switching element Sw1 to output a control signal in accordance with which the charging of the first rechargeable battery 11 is started to the first charging circuit 13. In response to the control signal, the first charging circuit 13 charges the first rechargeable battery 11 with the electric power supplied from the external power source. Thereafter, in the case where it is detected that the battery capacity of the first rechargeable battery 11 has reached the charging target value, the control circuit 21 turns OFF the switching element Sw1 to stop the charging of the first rechargeable battery 11.

Likewise, in the case where it is decided that the battery capacity of the second rechargeable battery 12 is smaller than the charging target value based on the calculation result in the second capacity calculating circuit 16, the control circuit 21 turns ON the switching element Sw2 to output a control signal in accordance with which the charging of the second rechargeable battery 12 is started to the second charging circuit 14. In response to the control signal, the second charging circuit 14 charges the second rechargeable battery 12 with the electric power supplied from the external power source. Thereafter, in the case where it is detected that the battery capacity of the second rechargeable battery 12 has reached the charging target value, the control circuit 21 turns OFF the switching element Sw2 to stop the charging of the second rechargeable battery 12.

Incidentally, although the charging target value of the battery capacity of each of the rechargeable batteries may be 100% (full charge of the battery), the charging target value of the battery capacity of each of the rechargeable batteries may be a smaller value than 100%, and the first rechargeable battery 11 is difficult in charging target value from the second rechargeable battery 12. In particular, since the first rechargeable battery 11, as will be described later, is charged with the electric power supplied from the secondary rechargeable battery 12 while the external power source is not connected, if the charging target value is set to 100%, then, it is possible that the first rechargeable battery 11 is held in the full charge over a relatively long period of time. However, if the rechargeable battery becomes the state of the full charge in a long period of time, then, it is feared that the deterioration of the battery is accelerated. Then, the charge target value of the battery capacity of the first rechargeable battery 11 may have a lower value (for example, 80%) than that of the second rechargeable battery 12.

It should be noted that although in this case, the control circuit 21 decides whether or not the charging of each of the rechargeable batteries is ended based on the calculation result in the corresponding capacity calculating circuit, the present embodiment is by no means limited thereto. Then, the control circuit 21 may decide the timing of the end of the charging based on the magnitudes of the battery voltage and the charging current of the rechargeable battery.

Figure 2:
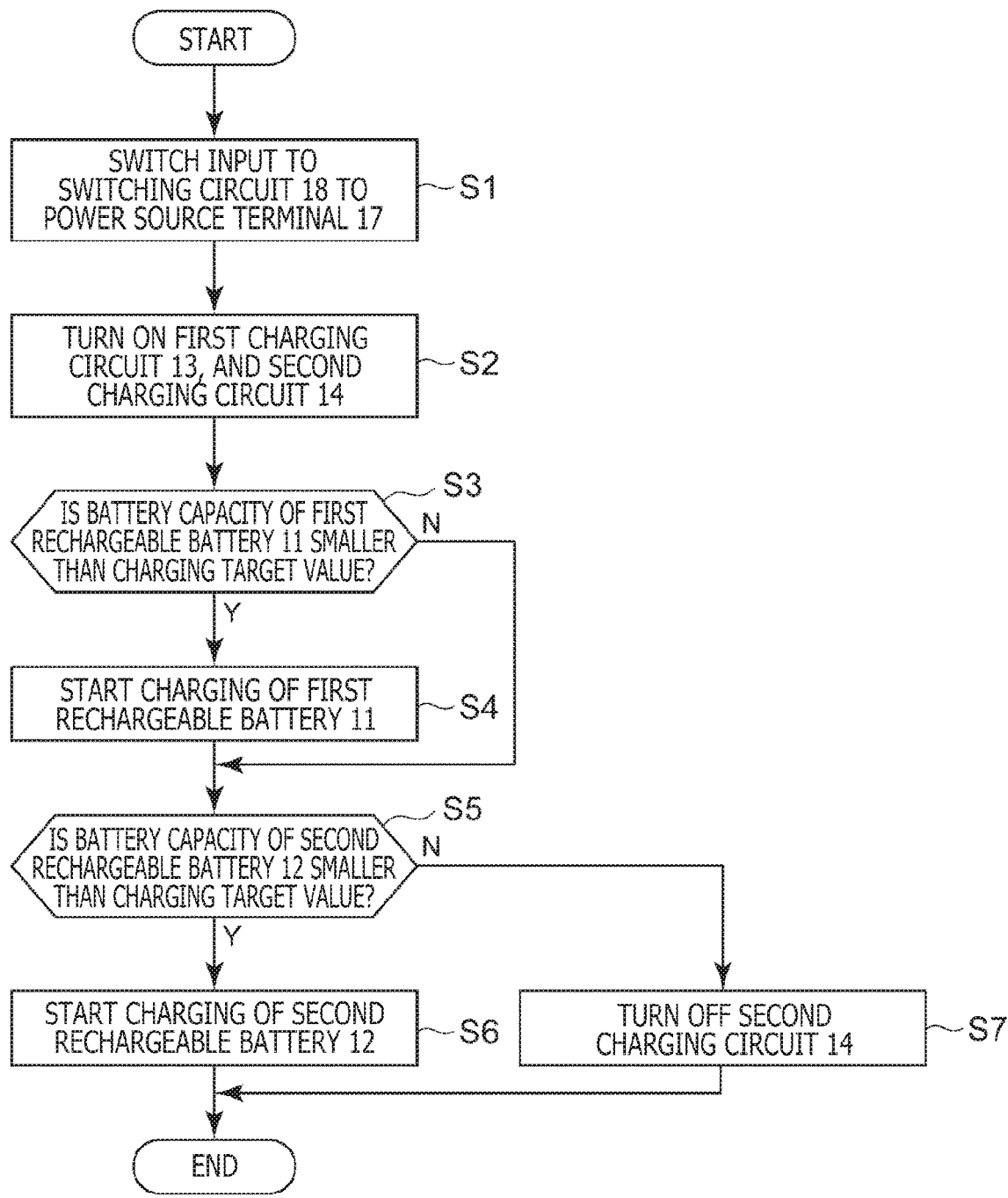
FIG. 2 is a flow chart depicting an example of a flow of processing when an external power source is connected.

Here, a description will be given with respect to an example of a flow of the control when the external power source is newly connected to the power source terminal 17 with reference to a flow chart of FIG. 2. When the control circuit 21 detects that the external power source is connected to the power source terminal 17, the control circuit 21 turns ON the switching element Sw3 of the switching circuit 18, and turns OFF the switching element Sw4 to switch the input to the switching circuit 18 to the power source terminal 17 side (S1). As a result, the voltage Vi1 supplied from the external power source is inputted to each of the first charging circuit 13 and the second charging circuit 14.

Subsequently, the control circuit 21 turns ON each of the first charging circuit 13 and the second charging circuit 14 (S2). Thereafter, the control circuit 21 decides whether or not the battery capacity of the first rechargeable battery 11 is smaller than the charging target value by using the calculation result in the first capacity calculating circuit 15 (S3). In the case where the battery capacity of the first rechargeable battery 11 is smaller than the charging target value, the control circuit 21 turns ON the switching element Sw1 to instruct the first charging circuit 13 so as to start the charging of the first rechargeable battery 11 (S4). On the other hand, in the case where the battery capacity of the first rechargeable battery 11 is equal to or larger than the charging target value, since the first rechargeable battery 11 needs not to be charged at that time, the processing directly proceeds to next Step.

Next, the control circuit 21 decides whether or not the battery capacity of the second rechargeable battery 12 is smaller than the charging target value by using the calculation result in the second capacity calculating circuit 16 (S5). In the case where the battery capacity of the second rechargeable battery 12 is smaller than the charging target value, the control circuit 21 turns ON the switching element Sw2 to instruct the second charging circuit 14 so as to start the charging of the second rechargeable battery 12 (S6). On the other hand, in the case where the battery capacity of the second rechargeable battery 12 is equal to or larger than the charging target value, since the second rechargeable battery 12 needs not to be charged at that time, the control circuit 21 turns OFF the charging control for the second charging circuit 14 (S7). When the external power source is connected to the power source terminal 17 from the above flow, the loads 20 can operate by the supplied electric power, and the charging of the rechargeable battery for which the charging is necessary can be started.

It should be noted that in the above description, both the first rechargeable battery 11 and the second rechargeable battery 12 are simultaneously charged with the electric power supplied from the external power source. However, the present embodiment is by no means limited thereto. In the electrical machinery and apparatus 1, the first rechargeable battery 11 and the second rechargeable battery 12 may be charged one by one all at once. In this case, the electric power supply ability of the external power source can be reduced as compared with the case where the first rechargeable battery 11 and the second rechargeable battery 12 are simultaneously charged. Moreover, in this case, in the electrical machinery and apparatus 1, the first rechargeable battery 11 showing the larger maximum discharge current may be preferentially charged, and after the battery capacity of the first rechargeable battery 11 has reached the charging target value, the secondary rechargeable battery 12 may be charged. As a result, the state in which the electric power is usually accumulated in the first rechargeable battery 11 which can momentarily output the large electric power can be held. In the example, in the case where the battery capacity of the first rechargeable battery 11 falls below a given threshold value by the operation of the load 20, the charging of the second rechargeable battery 12 is stopped, and the charging of the first rechargeable battery 11 is restarted.

Next, a description will be given with respect to the operation of the electrical machinery and apparatus 1 in a state in which no external power source is connected. In the case where the connection of the external power source to the power source terminal 17 is released, the control circuit 21 switches the switching element Sw3 of the switching circuit 18 to turn-OFF, and switches the switching element Sw4 to turn-ON. As a result, the output of the boosting circuit 19, and the input of the first charging circuit 13 are connected to each other through the switching circuit 18. Moreover, the second charging circuit 14 turns OFF a charging function while the switching element Sw2 is turned ON in response to the instruction issued from the control circuit 21. The control circuit 21 starts the operation of the boosting circuit 19 together with that operation. At this time, the voltage Vs2 outputted from the second charging circuit 14 becomes the voltage generated through the discharge of the secondary rechargeable battery 12. The boosting circuit 19 boosts the voltage Vs2 generated through the discharge, and inputs the voltage Vs2 thus boosted to the first charging circuit 13 through the switching circuit 18. That is, in the case where no external power source is connected, instead of the electric power supplied from the external power source, the electric power supplied from the second rechargeable battery 12 is inputted to the first charging circuit 13, and the load 20 operates by this electric power.

Incidentally, similarly to the case where the load 20 operates by the electric power supplied from the external power source, in the case where the electric power is insufficient only with the electric power supplied from the second rechargeable battery 12, the load 20 may operate by consuming the electric power supplied from the first rechargeable battery 11. As previously stated, in the present embodiment, the first rechargeable battery 11 is larger in maximum discharge current than the second rechargeable battery 12. For this reason, even in the case where a large amount of electric power is necessary for the load 20 for a short period of time and thus the supplied electric power from the second rechargeable battery 12 is insufficient, by supplying the electric power from the first rechargeable battery 11, the load 20 becomes able to operate.

Moreover, in the case where the battery capacity of the first rechargeable battery 11 is reduced, the first charging circuit 13 charges the first rechargeable battery 11 with the electric power supplied from the secondary rechargeable battery 12. Then, if the battery capacity of the first rechargeable battery 11 becomes the sufficiently large value, then, the control circuit 21 may stop the operation of the boosting circuit 19, and may turn OFF the switching Sw2 to stop the electric power supply from the secondary rechargeable battery 12. In this case, the load 20 operates only by the electric power supplied from the first rechargeable battery 11. In the case where the electric power supply results in that the battery capacity of the first rechargeable battery 11 falls below the given threshold value, the second charging circuit 14 and the boosting circuit 19 are operated again to charge the first rechargeable battery 11 with the electric power supplied from the second rechargeable battery 12.

In the case where no external power source is connected in such a manner, the control in accordance with which the load 20 is operated by the supplied electric power from the first rechargeable battery 11, the load 20 is operated by the supplied electric power from the second rechargeable battery 12, or the load 20 is operated by the supplied electric powers from both the first and second rechargeable batteries 11 and 12 can be made in response to the charging state of the first rechargeable battery 11 or the electric power necessary for the load 20. In addition, in the case where the battery capacity of the first rechargeable battery 11 is reduced, the first rechargeable battery 11 is charged with the supplied electric power from the second rechargeable battery 12, thereby enabling a state in which the electric power is accumulated in the first rechargeable battery 11 which can supply the large current to be held.

Figure 3:
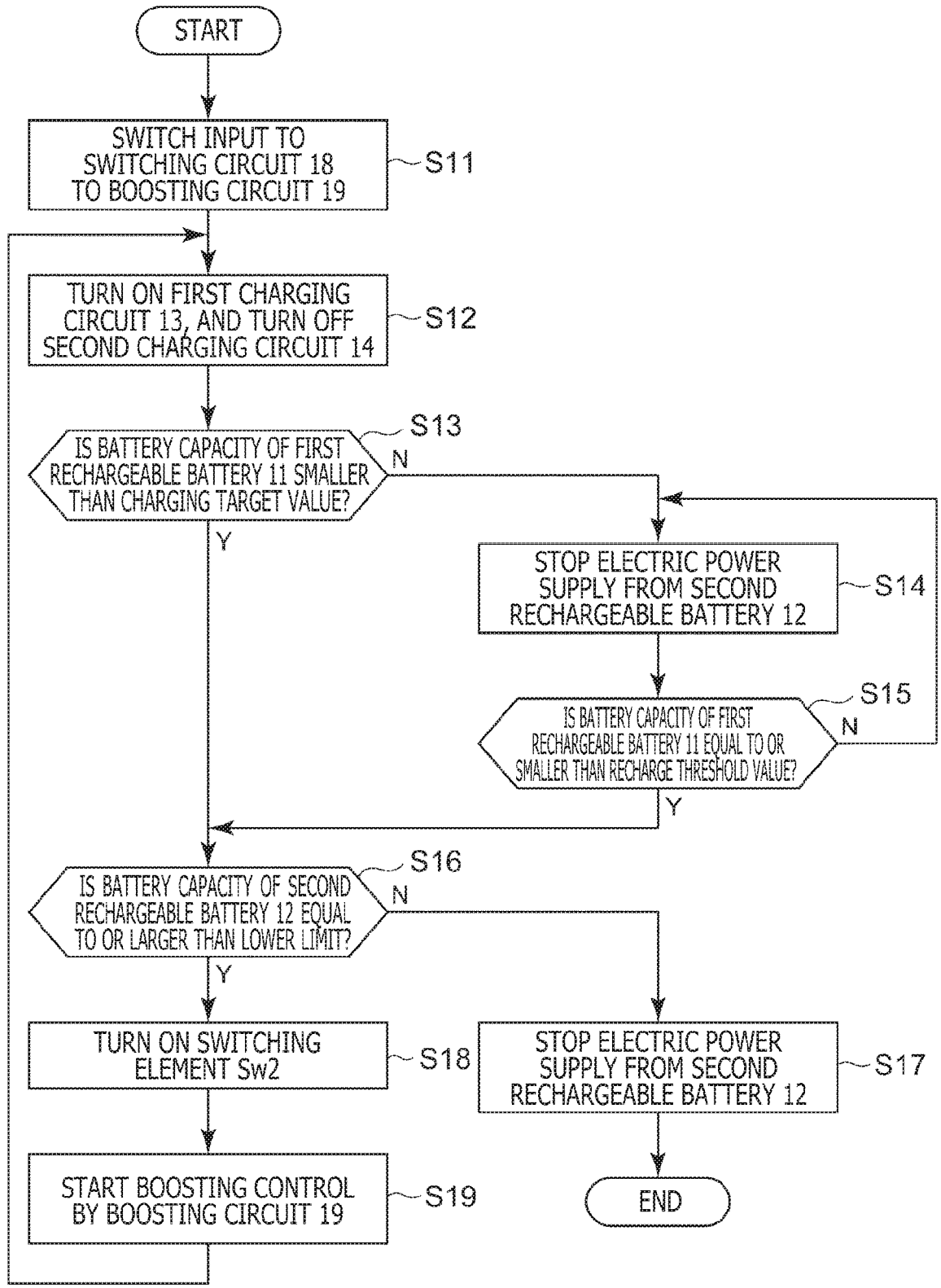
FIG. 3 is a flow chart depicting an example of a flow of processing when the connection of the external power source is released.

Here, a description will be given with respect to an example of a flow of the control when the connection of the external power source is released with reference to a flow chart of FIG. 3. When the control circuit 21 detects that the external power source is removed away from the power source terminal 17, the control circuit 21 turns OFF the switching element Sw3 of the switching circuit 18 and turns ON the switching element Sw4 to switch the input to the switching circuit 18 to the boosting circuit 19 side (S11). As a result, the voltage Vi2 supplied from the boosting circuit 19 is inputted to the first charging circuit 13.

Subsequently, the control circuit 21 turns ON the switching element Sw1 to start the operation of the first charging circuit 13, and turns OFF the charging function of the second charging circuit 14 (S12). As a result, the electric power supplied from the boosting circuit 19 through the switching circuit 18 is not inputted to the second charging circuit 14, but is inputted to only the first charging circuit 13. Thereafter, the control circuit 21 decides whether or not the battery capacity of the first rechargeable battery 11 is smaller than the charging target value by using the calculation result in the first capacity calculating circuit 15 (S13).

In the case where it is decided in S13 that the battery capacity of the first rechargeable battery 11 is equal to or larger than the charging target value, the control circuit 21 turns OFF the switching element Sw2 of the second charging circuit 14, and turns OFF the charging function of the first charging circuit 13, and the boosting circuit 19. As a result, the electric power supply from the second rechargeable battery 12 through the boosting circuit 19 and the switching circuit 18 is stopped (S14). In this state, the load 20 operates by only the electric power supplied from the first rechargeable battery 11. In this state, the control circuit 21 monitors whether or not the battery capacity of the first rechargeable battery 11 becomes equal to or smaller than a recharge threshold value (S15). Here, the recharge threshold value is a value of the battery capacity with which it is decided that the recharge of the first rechargeable battery 11 is necessary, and the value (for example, 60%) which is smaller than the charging target value.

In the case where it is decided in S13 that the battery capacity of the first rechargeable battery 11 is smaller than the charging target value, and in the case where it is decided in S15 that the battery capacity of the first rechargeable battery 11 becomes equal to or smaller than the recharge threshold value, the control circuit 21 decides whether or not the battery capacity of the second rechargeable battery 12 is equal to or larger than the lower limit by using the calculation result in the second capacity calculating circuit 16 (S16). The lower limit in this case is the lowest value (for example, 10%) of the battery capacity with which the electric power supply from the second rechargeable battery 12 can be performed. In the case where the battery capacity of the second rechargeable battery 12 falls below than the lower limit, the control circuit 21 turns OFF the switching element Sw2 of the second charging circuit 14, and turns OFF the boosting circuit 19 to stop the electric power supply from the second rechargeable battery 12 (S17). In this case, since the sufficient electric power is not accumulated in the whole of the electrical machinery and apparatus 1, for example, a charging lamp may be lighted to urge the user to connect the external power source.

On the other hand, in the case where it is decided in S16 that the battery capacity of the second rechargeable battery 12 is equal to or larger than the lower limit, the control circuit 21 instructs the second charging circuit 14 to turn ON the switching element Sw2 (S18). Then, the control circuit 21 turns ON the boosting circuit 19 to cause the boosting circuit 19 to start the boosting control (S19). As a result, the output voltage from the second rechargeable battery 12 is boosted to be inputted to the first charging circuit 13 through the switching circuit 18. In such a way, the first rechargeable battery 11 is charged with the electric power supplied from the second rechargeable battery 12, and the load 20 operates.

Here, a description will be given with respect to a concrete example of the boosting control by the boosting circuit 19. As previously stated, the boosting circuit 19 boosts the voltage Vs2 outputted from the second charging circuit 14 to the voltage Vi2. The voltage Vi2 may be a fixed value. In this case, the voltage Vi2 after the boosting is set to a value exceeding the maximum value of the battery voltage of the first rechargeable battery 11. However, if a difference between the battery voltage of the first rechargeable battery 11, and the voltage Vi2 is large, the electric power consumption is generated in the first charging circuit 13 all the more, which causes the generation of heat, the energy lost or the like. Then, the control circuit 21 may change the voltage Vi2 with time in response to the fluctuation of the charging voltage of the first rechargeable battery 11. In this case, the control circuit 21 acquires periodically the information associated with the output voltage Vs1 from the first charging circuit 13, updates the voltage Vi2 in response to that information, and instructs the boosting circuit 19 to set the voltage Vi2 after the update as the target value of the boosting control.

Figure 4A:
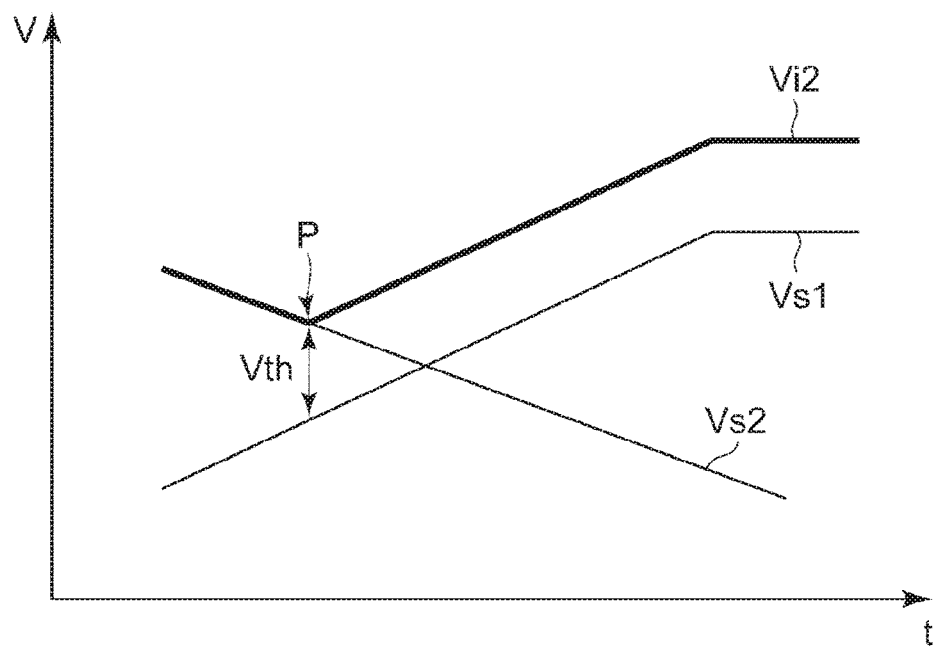
FIG. 4A is a graph explaining an example of boosting control by a boosting circuit.

FIG. 4A is a graph depicting a correspondence relationship between the voltage Vi2 and the output voltage Vs1 from the first charging circuit 13 in the case where such update control for the voltage Vi2 is performed. In an example of this figure, while the output voltage Vs2 from the second charging circuit 14 exceeds (Vs1+Vth), the boosting circuit 19 performs no boosting. For this reason, the voltage Vi2 agrees with the voltage Vs2. In the case where the voltage Vs2 becomes equal to or smaller than (Vs1+Vth) (at a point p in the figure), the boosting circuit 19 starts the boosting. Therefore, the control is made in such a way that the voltage Vi2 agrees with (Vs1+Vth). The threshold value Vth in this case is determined in the consideration of the voltage drop by a resistance component on a current path from the boosting circuit 19 to the first charging circuit 13. In the figure, Vth is set as a fixed value, and the magnitude of Vth in this case is determined in response to a maximum value of a current IO which is caused to flow via the switching circuit 18. That is, Vth is determined as a value responding to the voltage drop which is generated when the maximum current IO is caused to flow. However, the control circuit 21 may change the magnitude of Vth in response to the magnitude of the current IO in real time. In this case, the control circuit 21 monitors the current IO and the voltage Vs1, and adds Vth determined in response to the value of the current IO, and the voltage Vs1 to each other to determine the value of the voltage Vi2. As a result, a difference between the input voltage and the output voltage of the first charging circuit 13 can be reduced, thereby efficiently performing the operation.

Figure 4B:
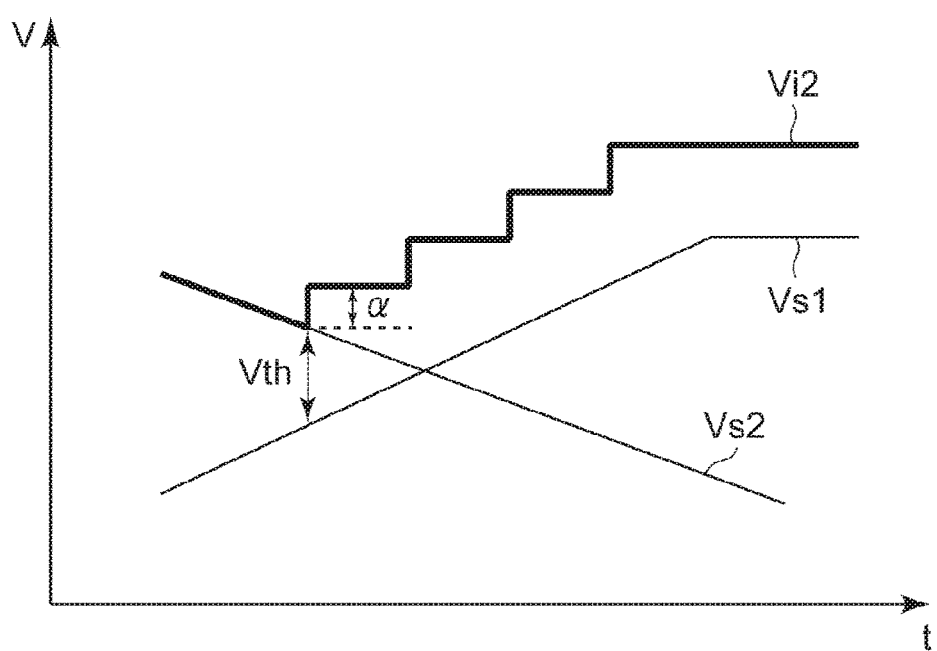
FIG. 4B is a graph explaining another example of the boosting control by the boosting circuit.

FIG. 4B depicts another example of the boosting control by the boosting circuit 19. In the example of the figure, the voltage Vi2 is not linearly fluctuated in conjunction with the voltage Vs1 unlike the example depicted in FIG. 4A, but the voltage Vi2 is changed step by step. In this case, while the voltage Vs2 exceeds (Vs1+Vth), similarly to the case of FIG. 4A, no boosting is performed. On the other hand, in the case where the voltage Vs2 becomes equal to or smaller than (Vs1+Vth), the boosting circuit 19 sets the voltage Vs2 to (Vs1+Vth+α) to start the boosting. Thereafter, whenever the voltage Vs1 rises by α, the boosting circuit 19 updates the voltage Vs2 by using the voltage Vs1 at that time. According to such control, the frequency of the updating of the voltage Vs2 can be reduced, and the electric power can be stably supplied to some extent.

As has been described so far, according to the electrical machinery and apparatus 1 of the present embodiment, the input to the first charging circuit 13 is switched by using the switching circuit 18, whereby the first rechargeable battery 11 can be charged with not only the electric power supplied from the external power source, but also the electric power supplied from the second rechargeable battery 12. For this reason, as long as the battery capacity of the second rechargeable battery 12 is remained, the first rechargeable battery 11 can be charged, so that the electric power supply with the large current can be performed for the load 20 anytime.

Figure 5:
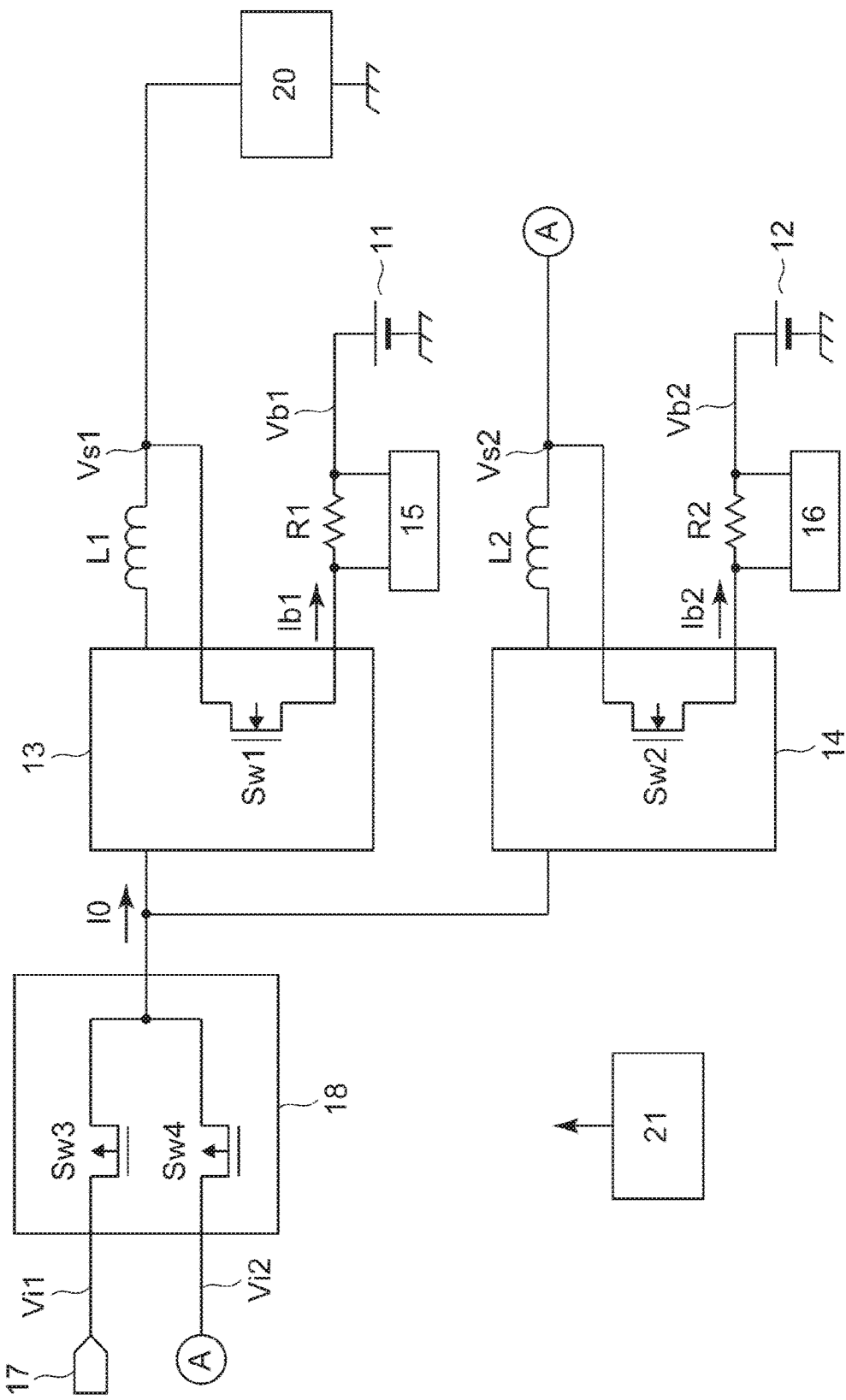
FIG. 5 is a circuit diagram depicting another example of a circuit configuration of an electrical machinery and apparatus according to a modified change of the embodiment of the present invention.

It should be noted that the embodiment of the present invention is by no means limited to the embodiment described above. For example, the boosting control which is made by the boosting circuit 19 in the above description may also be made by the first charging circuit 13. In this case, the boosting circuit 19 becomes unnecessary. FIG. 5 is a circuit diagram depositing a circuit configuration in this case. In this modified change, instead of absence of the boosting circuit 19, the first charging circuit 13 has a function of a step-up and down conversion responding to both the step-up and the step-down. The output of the second charging circuit 14 is connected to the switching circuit 18 without going through the boosting circuit 19. In the case where no external power source is connected, the output of the second charging circuit 14, and the input of the first charging circuit 13 are connected to each other by the switching circuit 18, and the voltage supplied from the second rechargeable battery 12 is inputted to the first charging circuit 13 without being boosted. That is, in this example, the voltage Vs2 agrees with the voltage Vi2. The first charging circuit 13 boosts the voltage Vi2 to the voltage corresponding to the battery voltage Vb1 of the first rechargeable battery 11 and outputs the voltage obtained through the boosting to charge the first rechargeable battery 11.

In addition, the circuit configuration of the electrical machinery and apparatus 1 is by no means limited to that depicted in FIG. 1 or FIG. 5, and may be various kinds of configurations each fulfilling the similar function. For example, although in the above description, the switching element Sw1 and the switching element Sw2 are respectively built in the first charging circuit 13 and the second charging circuit 14, the switching elements may be present outside the charging circuits. In addition, although in the above description, the different two kinds of rechargeable batteries are used together with each other, three or more kinds of rechargeable batteries may be used together with one another.

REFERENCE SIGNS LIST

1 Electrical machinery and apparatus, 11 First rechargeable battery, 12 Second rechargeable battery, 13 First charging circuit, 14 Second charging circuit, 15 First capacity calculating circuit, 16 Second capacity calculating circuit, 17 Power source terminal, 18 Switching circuit, 19 Boosting circuit, 20 Load, 21 Control circuit.

The invention claimed is:

1. An electrical machinery and apparatus having a first rechargeable battery, and a second rechargeable battery different in characteristics from the first rechargeable battery built therein, the electrical machinery and apparatus comprising:
a first charging circuit charging the first rechargeable battery;
a second charging circuit charging the second rechargeable battery;
a switching circuit switching a supply source of the electric power inputted to the first charging circuit between an external electric power supply source, and the second rechargeable battery; and
a boosting circuit disposed between an output side of the second charging circuit, and the switching circuit, wherein
the second charging circuit charges the second rechargeable battery with an electric power supplied from an outside of the electrical machinery and apparatus,
the first charging circuit charges the first rechargeable battery with both the electric power supplied from the outside of the electrical machinery and apparatus, and an electric power supplied from the second rechargeable battery through the switching circuit, and
the boosting circuit boosts the electric power outputted from the second rechargeable battery through the second charging circuit and inputs the boosted electric power to the switching circuit.

2. The electrical machinery and apparatus according to claim 1, wherein the switching circuit is connected to a power source terminal, and switches the supply source of the electric power to the electric power supply source when the electric power supply source is connected to the power source terminal, and switches the supply source of the electric power to the secondary rechargeable battery when no electric power supply source is connected.

3. The electrical machinery and apparatus according to claim 1, wherein the boosting circuit boosts the electric power outputted from the secondary rechargeable battery to a voltage which is determined in response to the output voltage from the first charging circuit, and inputs the voltage to the switching circuit.

* * * * *